(12) United States Patent
Firestone

(10) Patent No.: US 11,985,954 B2
(45) Date of Patent: May 21, 2024

(54) MODULAR CAT CLIMBING STRUCTURE

(71) Applicant: Better Instincts, LLC, Atlanta, GA (US)

(72) Inventor: Jenifer Firestone, Atlanta, GA (US)

(73) Assignee: Jenifer J. Firestone, Asheville, NC (US)

( * ) Notice: Subject to any disclaimer, the term of this patent is extended or adjusted under 35 U.S.C. 154(b) by 0 days.

(21) Appl. No.: 18/188,836

(22) Filed: Mar. 23, 2023

(65) Prior Publication Data
US 2023/0354776 A1 Nov. 9, 2023

Related U.S. Application Data

(60) Provisional application No. 63/338,098, filed on May 4, 2022.

(51) Int. Cl.
*A01K 15/02* (2006.01)
(52) U.S. Cl.
CPC ................. *A01K 15/024* (2013.01)
(58) Field of Classification Search
CPC .......... A01K 15/024; A61H 2201/0126; A61H 2201/0123; A63B 21/1618; A63B 21/1627; F16B 21/073; F16B 5/0692
USPC ............................... 119/706, 703; 248/200.1
See application file for complete search history.

(56) References Cited

U.S. PATENT DOCUMENTS

| | | | |
|---|---|---|---|
| 3,595,209 A | 7/1971 | Parker | |
| 4,907,637 A * | 3/1990 | Hintsa | F16B 5/0692 160/368.1 |
| 5,247,902 A | 9/1993 | Williams | |
| 5,829,390 A * | 11/1998 | Jonilla | A01K 15/025 119/702 |
| 6,343,569 B1 * | 2/2002 | Buendiger | A01K 15/024 119/706 |
| 8,074,608 B1 | 12/2011 | Smith | |

(Continued)

OTHER PUBLICATIONS

Risinger, Matt, Door Jamb Light Switch and Door Jamb Protection, Dec. 15, 2009, Youtube Video https://youtu.be/XstfZIELepg (Year: 2009).*

(Continued)

*Primary Examiner* — Tien Q Dinh
*Assistant Examiner* — Katelyn T Truong
(74) *Attorney, Agent, or Firm* — Bekiares Eliezer LLP; Kevin Bastuba

(57) ABSTRACT

The present disclosure provides a modular cat recreation structure comprising: one or more sections configured to be removably mounted to a household structure, wherein each of the one or more sections comprises: an external surface; first and second opposing arms defining a slot therebetween; a hollow central opening continuous with the slot and configured to accommodate a portion of the household structure therein; first and second engagement surfaces disposed on terminal edges of the first and second opposing arms and configured to apply a biasing force against first and second opposing surfaces of the household structure when the portion of the household structure is inserted into the slot; first and second projections extending axially away from the first and second opposing arms, the first and second projections being operable to adjust a width of the slot via application of first and second opposing forces to the first and second projections.

20 Claims, 18 Drawing Sheets

(56) References Cited

U.S. PATENT DOCUMENTS

| | | | |
|---|---|---|---|
| 8,695,533 B1 | 4/2014 | Mulligan et al. | |
| 9,186,294 B1* | 11/2015 | Free | A61H 7/002 |
| 2001/0045191 A1* | 11/2001 | Gear | A01K 15/024 |
| | | | 119/706 |
| 2003/0000483 A1* | 1/2003 | Haber | A01K 15/024 |
| | | | 119/706 |
| 2004/0011299 A1 | 1/2004 | Lamson-Scribner | |
| 2005/0210817 A1* | 9/2005 | Carrier | F16B 5/0692 |
| | | | 52/698 |
| 2009/0050072 A1 | 2/2009 | Moser et al. | |
| 2010/0326367 A1* | 12/2010 | Wedertz | A01K 15/024 |
| | | | 119/706 |
| 2011/0166481 A1* | 7/2011 | Rhoad | A61H 7/002 |
| | | | 248/231.51 |
| 2012/0291718 A1* | 11/2012 | Williams | A01K 15/024 |
| | | | 119/706 |
| 2020/0008391 A1 | 1/2020 | Fofana | |

OTHER PUBLICATIONS

BGX Materials, Door Frame Protection with Ram Jamb, Aug. 1, 2019, Youtube Video https://www.youtube.com/watch?v=5zEacePNI7A (Year: 2019).*

* cited by examiner

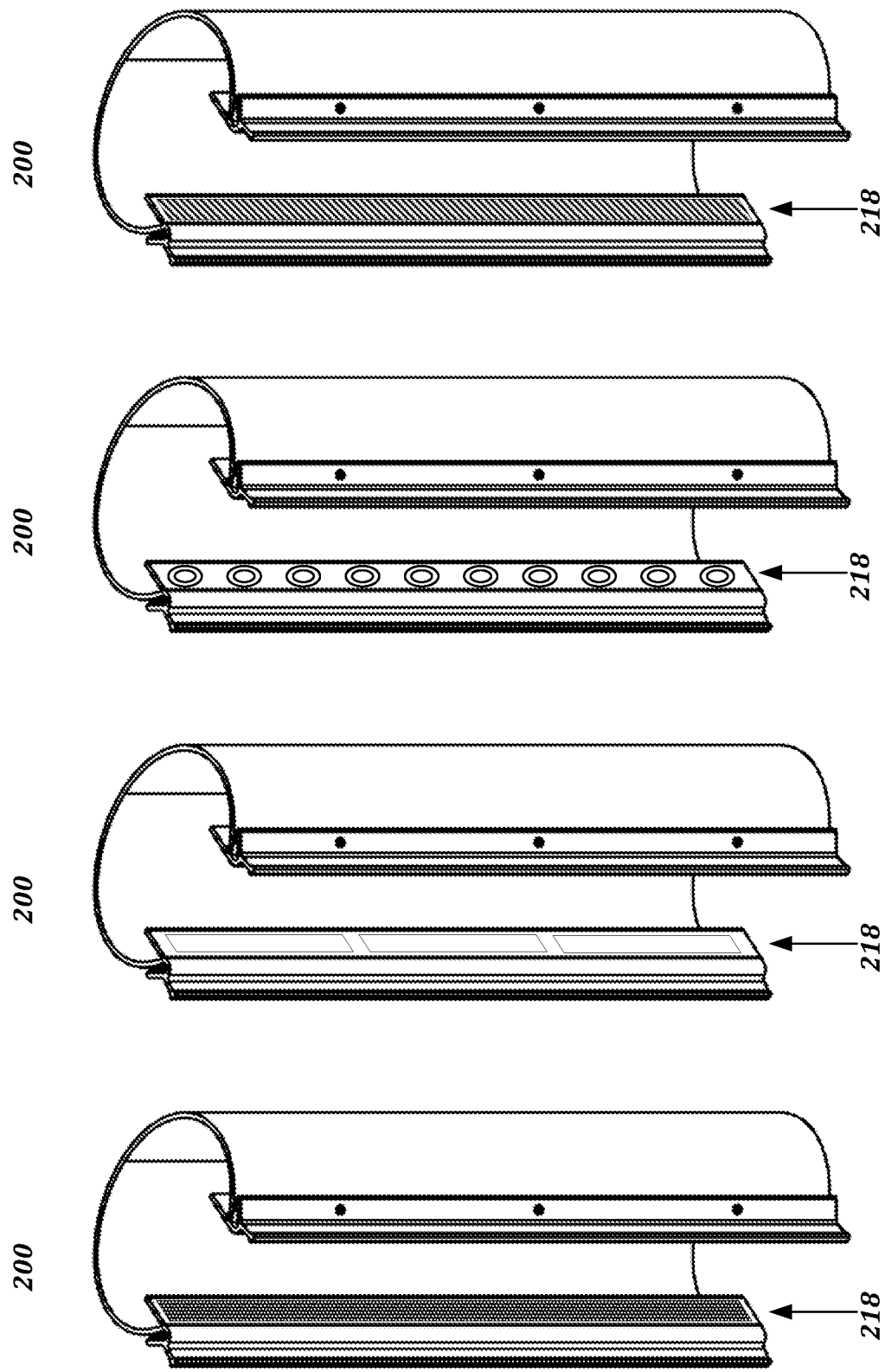

MODULAR CAT CLIMBING STRUCTURE

RELATED APPLICATION

Under provisions of 35 U.S.C. § 119(e), the Applicant claims benefit of U.S. Provisional Application No. 63/338, 098 filed on May 4, 2022, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to pet recreation structures, and in particular to cat climbing and scratching structures.

BACKGROUND

Domestic cats require a certain amount of exercise to lead happy, healthy lives, which can be difficult to accomplish for the increasing numbers of indoor cats. Many necessary and healthy cat activities, such as scratching and climbing, are likely to result in damage to common household furnishings. Therefore, there is a demand for specialized structures (e.g., climbing trees, scratching posts, etc.) to fulfill these needs.

However, conventional cat recreation structures are difficult to transport, difficult to assemble, and difficult to dispose of. Because they are so large and cumbersome, many cat climbing structures do not fit easily into a sedan or other small vehicle, and their bulky profile makes them difficult to carry. Conventional cat recreation structures take up a significant amount of floor space, which may not be feasible or desirable, particularly for urban apartment/condo dwellers residing in small spaces. While modular cat recreation structures exist, their assembly often requires time, specialized tools and/or hardware, and usually permanent property damage such as drilling into walls. Free-standing floor-to-ceiling structures are often unstable, posing a danger to both the cat and people living in the house. Finally, they are typically composed of non-biodegradable materials, becoming landfill after they reach the end of their lifecycle.

Therefore, there is a need for modular, environmentally friendly cat recreation structures that can be easily and removably installed in households of any size.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one embodiment, the present disclosure provides various modular cat recreation structures that are easy to removably mount to common household structures such as a wall partition, a door frame, or a window frame without the use of tools and/or without requiring permanent damage to the household structure. The cat recreation structures may have a small profile, such that when they are mounted, they consume no floor space and only minimal room space, for example, less than about 5 inches of room space. In some embodiments, they are composed of one or more recyclable materials and/or are capable of being recycled.

One example embodiment of a cat recreation structure comprises one or more partial cylindrical sections configured to be removably mounted to a household structure without the use of tools. Each of the one or more sections may comprise a rough external surface, such as a carpeted surface, having a sufficient coefficient of friction to enable common cat activities such as climbing and/or scratching. Each of the one or more sections may further comprise first and second opposing arms that define a slot therebetween.

A hollow central opening continuous with the slot may be configured to accommodate a portion of the household structure therein. In some embodiments, first and second engagement surfaces disposed on terminal edges of the first and second opposing arms are configured to apply a biasing force against first and second opposing surfaces of the household structure when the portion of the household structure is inserted into the slot, to thereby secure the section in place against the household structure. First and second projections may extend axially away from the first and second opposing arms. In some embodiments, the first and second projections may be operable to adjust a width of the slot via application of first and second opposing forces to the first and second projections, respectively.

In another embodiment, the present disclosure provides a modular cat recreation structure comprising: one or more sections being partially cylindrical and configured to be removably mounted to a household structure, wherein each of the one or more sections comprises: a rough external surface; first and second opposing arms defining a slot therebetween; a hollow central opening continuous with the slot and configured to accommodate a portion of the household structure therein; first and second engagement surfaces disposed on terminal edges of the first and second opposing arms and configured to apply a biasing force against first and second opposing surfaces of the household structure when the portion of the household structure is inserted into the slot; and first and second projections extending axially away from the first and second opposing arms, the first and second projections being operable to adjust a width of the slot via application of first and second opposing forces to the first and second projections.

In another embodiment, the present disclosure provides a modular cat recreation structure comprising: an elongated arcuate body portion comprising: an external surface, and an internal surface defining a perimeter of a cavity within the body portion; a first arm secured to and spanning a first edge of the arcuate section; a second arm secured to and spanning a second edge of the arcuate section, wherein the second arm and the first arm defining an opening to the cavity; a first engagement surface disposed on a terminal edge of the first arm and extending into the cavity, the first engagement surface being configured to apply a biasing force to a first surface of a household structure responsive to a portion of the household structure being received in the cavity; a second engagement surface disposed on a terminal edge of the second arm and extending into the cavity, the second engagement surface being configured to apply another biasing force to a second surface of the household structure responsive to a portion of the household structure received in the cavity; a first lip disposed on the terminal edge of the first arm and extending in a direction substantially parallel to a corresponding portion of the outer surface of the body portion; and a second lip disposed on the terminal edge of the second arm and extending in a direction substantially parallel to another corresponding portion of the outer surface of the body portion.

In another embodiment, the present disclosure provides a flexible elongated body portion comprising: an arcuate wall comprising a rough external surface, and a cavity defined within the arcuate wall; a first arm secured to and spanning a first end of the arcuate section, the first arm comprising: a first engagement surface disposed on a terminal edge of the first arm and extending into the cavity, a first lip extending from the terminal edge of the first arm and opposing a portion of the rough external surface, and a first projection extending orthogonally from the first lip; a second arm secured to and spanning a second end of the arcuate section, wherein the second arm and the first arm defining an opening to the cavity, the second arm comprising: a second engagement surface disposed on a terminal edge of the second arm and extending into the cavity, a second lip extending from the terminal edge of the second arm and opposing a portion of the rough external surface, and a second projection extending orthogonally from the second lip, wherein the first arm and the second arm define an opening to the cavity, wherein the first engagement surface and the second engagement surface are configured to apply a biasing force against a household structure responsive to a portion of the household structure being housed in the cavity.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 15A further illustrates one of the sections 200 with one or more removable fasteners 218;

FIG. 15B further illustrates one of the sections 200 with one or more removable fasteners 218;

FIG. 15C further illustrates one of the sections 200 with one or more removable fasteners 218;

FIG. 15D further illustrates one of the sections 200 with one or more removable fasteners 218;

DETAILED DESCRIPTION

Figure 1:
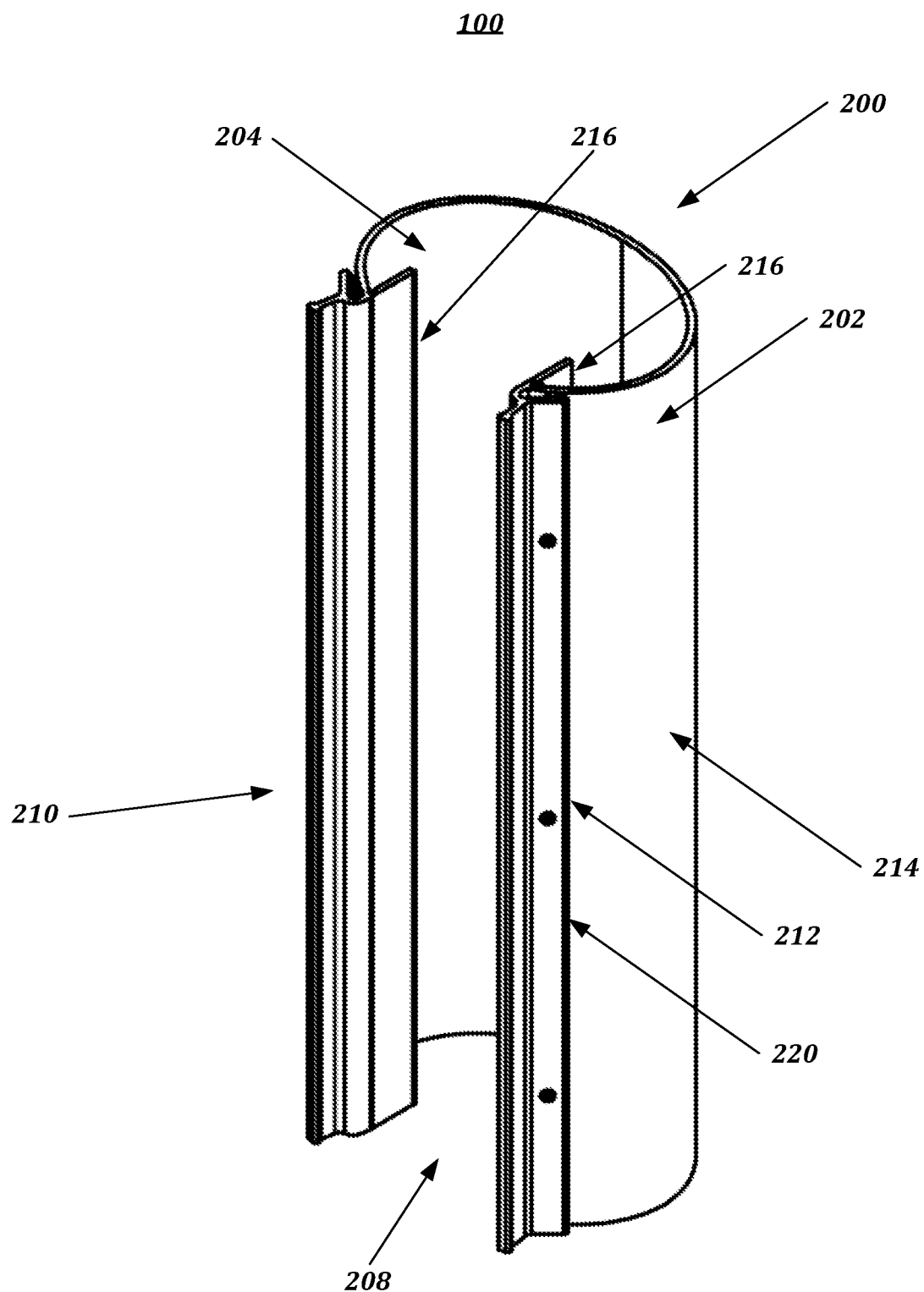
FIG. 1 illustrates a section 200 of a cat recreation structure 100.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and an example of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of cat recreation (e.g., climbing, scratching, etc.) embodiments of the present disclosure are not limited to use only in this context. For example, it will be appreciated that recreation structures according to the present disclosure may be used with other domestic animals that have a need to scratch and/or climb, e.g., sugar gliders. There may also be human uses for the present invention, e.g., scratching one's back, padding a doorway to ensure safety for children, etc.

Disclosed herein is a modular cat recreation structure 100. It is noted that the term modular cat recreation structure 100 may be used interchangeably with "structure" and/or "apparatus". The structure 100 may be used scratching, climbing and/or general physical interaction with a cat and/or feline species. In one example embodiment, the recreation structure may comprise one or more sections 200. The one or more section 200 may be configured for removable mounting to a conventional household structure. By way of non-limiting example, the one or more sections 200 may be configured to clamp around an edge of a wall, trim of a door frame, and/or a door frame via engagement of opposing flexible arms of the section with opposing surfaces of the wall or door frame. The one or more sections 200 may be used individually or may be stacked on top of one another to increase an effective height of the structure. In some embodiments, each of the sections is composed of a recycled and/or recyclable material. In other embodiments injection molding or plastic extrusion may be utilized for some or all of the formation of the structure 200. In other embodiments, any other suitable material (and/or combination thereof) may be used such as, but not limited to, for example:

a. any suitable rigid material,
 b. any suitable semi-rigid material,
 c. synthetic resin,
 d. thermopolymer elastomer,
 e. thermoresin,
 f. synthetic resin dispersant,
 g. any suitable water resistant material,
 h. any suitable plastic,
 i. any suitable metal and/or metal alloy,
 j. any suitable wood and/or wood composite,
 k. any suitable anti-slip material, and/or
 l. other suitable additives.

Referring to at least FIGS. 1-8, an example section of a recreational cat structure may comprise one or more sections 200. In some embodiments, each of the one or more sections 200 may comprise a body portion 202, illustrated at least in FIGS. 1-2. The body portion 202 may be elongated, generally cylindrical (e.g., cylindrical, elliptic cylindrical, or the like). The body portion 202 may comprise an arcuate wall 204 extending along a longitudinal axis between first and second ends, which may define a central opening 206 for accommodating a household structure or a portion of a household structure therein, illustrated at least in FIGS. 1-4. In some embodiments, the cylinder is only a partial cylinder (e.g., a ¾ cylinder, ⅝ cylinder, ⅞ cylinder, or the like) having a slot 208 that extends along the longitudinal axis of the body portion 202, illustrated at least in FIGS. 1-4. The slot 208 may be continuous with the center opening to allow the household structure to pass through the slot 208 and into the opening.

Figure 2:
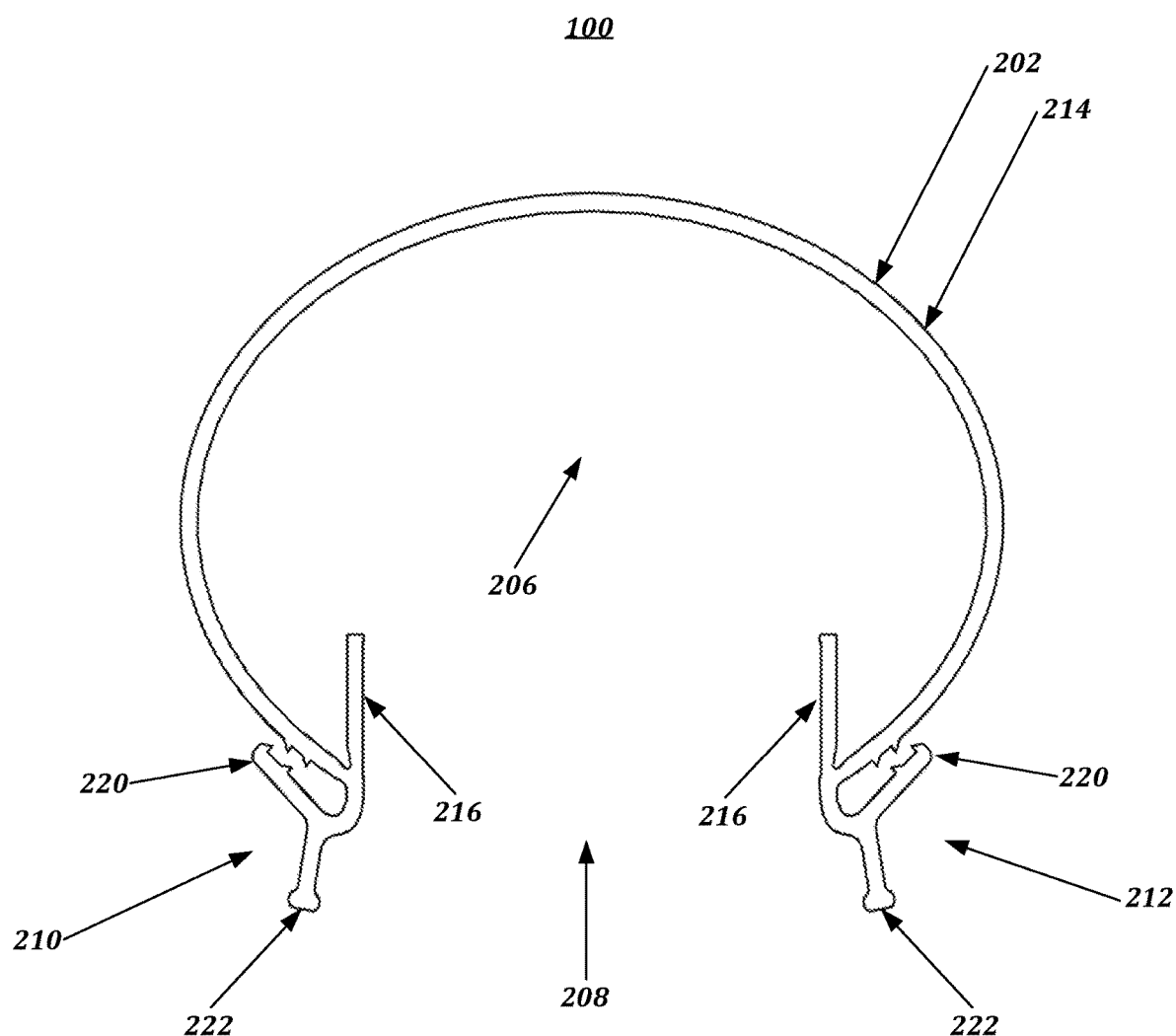
FIG. 2 illustrates a top view of the section 200.

As illustrated at least in FIG. 2, a cross-section of the body portion 202 taken along a plane perpendicular to the longitudinal axis of the body portion 202 may define a C-shaped semi-circle, with a first arm (or "side") 210 and a second arm (or "side") 212 opposing the first arm 210 (collectively, "opposing arms") defining the slot opening.

An exterior surface 214 of the body portion 202 may have a smooth surface or rough texture on at least a portion thereof, such as carpeting, padding, or other similarly rough surfaces, illustrated at least in FIGS. 1-4. The exterior surface 214 may provide sufficient friction and/or coarseness for a cat's nail when climbing and/or scratching. In some embodiments, the exterior surface 214 is integrally formed with or melded to the arcuate wall 204 of the body portion 202. In other embodiments, the exterior surface 214 comprises a removable textile such as a carpet. In such embodiments, a user may remove the carpet for cleaning, replace the old carpet with a new carpet when the old carpet wears out, exchange the carpet for one of a different color or texture, etc. It will be appreciated that the removable carpet may be comprised, at least partially, of recycled and/or recyclable materials. Preferably, the removable carpet is comprised entirely of recycled and/or recyclable materials.

The example section of the cat recreation structure 100 may be configured to releasably clamp a household structure or a portion of a household structure by flexing the first arm 210 and the second arm 212 and sliding the household structure or a portion thereof into the center opening 206 via the slot 208, illustrated at least in FIGS. 1-2. Thus mounted, the cat recreation structure 100 need not consume any floor space and only minimal room space, thus ensuring sufficient entertainment and exercise for the cat while remaining unobtrusive. Furthermore, the one or more sections 200 may easily be mounted, dismounted, and/or rearranged without the use of tools and without damaging the household structure to which they are mounted. The one or more sections 200 may thus be easily moved from one household to another, for example during moving or travel.

Figure 12:
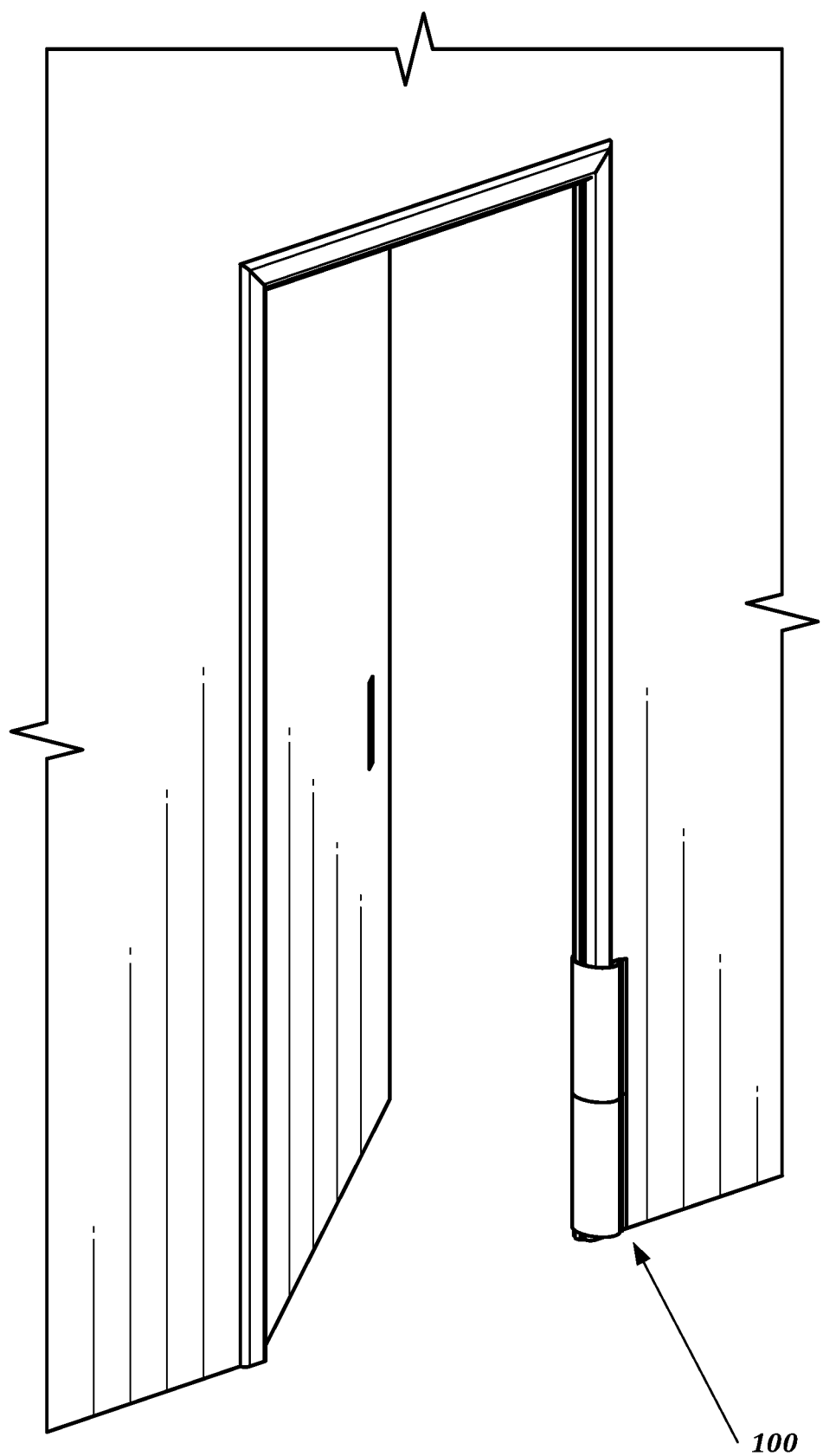
FIG. 12 illustrates the cat recreation structure 100 secured around a door frame end.
Figure 13:
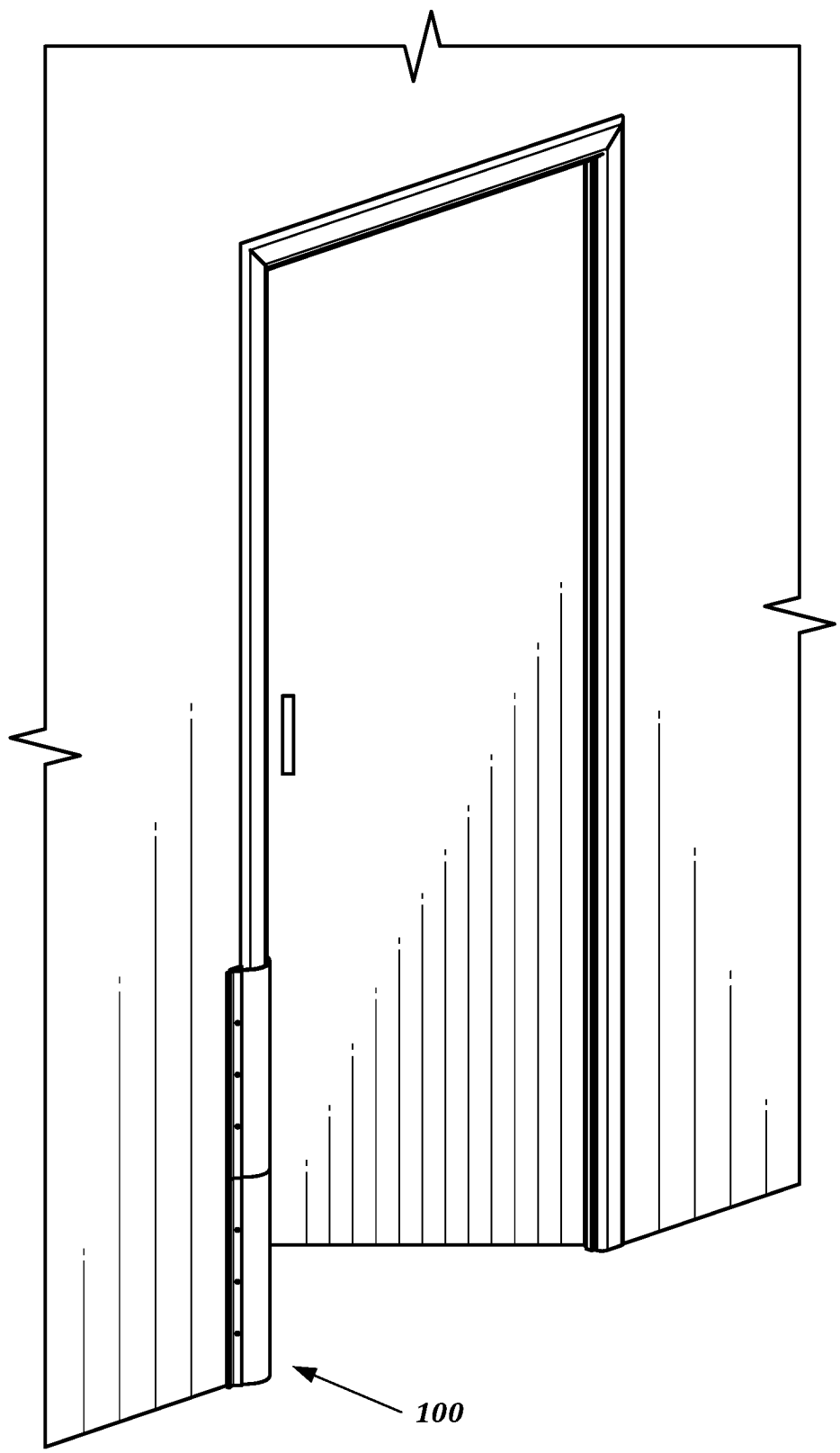
FIG. 13 further illustrates the cat recreation structure 100 secured around another door frame end.
Figure 14:
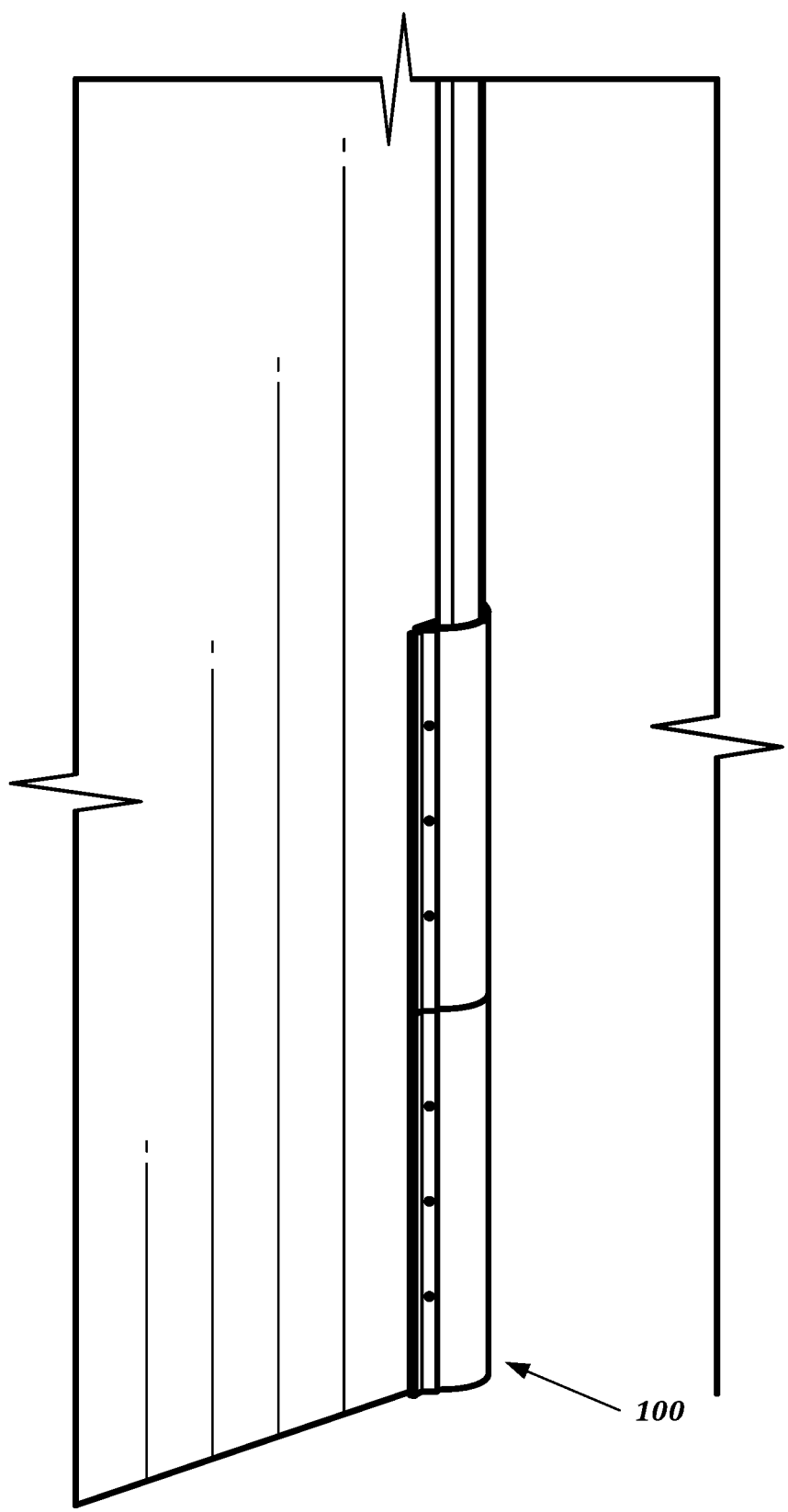
FIG. 14 illustrates the cat recreation structure 100 secured around an end portion of a partition wall.

In the illustrated embodiment of FIGS. 12-14, each of the one or more sections 200 are configured to clamp onto an end portion of a partition wall and/or a doorway wall end. Specifically, the first arm 210 and the second arm 212 of each of the one or more sections 200 may be configured to engage corresponding opposing surfaces of the wall, thus clamping the wall therebetween. The body portion 202 of each of the one or more sections 200 may exert a biasing force against the opposing wall surfaces sufficient to ensure that the section remains in place on the wall. In particular, the body portion 202 may be configured to revert to a default position in which the opposing arms will tend to minimize the width of the slot 208. In some embodiments, the biasing force of the opposing arms are sufficient to prevent the corresponding section 200 from slipping along the household structure to which it is mounted. In other embodiments, one or more adhesives removably adhered to one or more opposing arms of the section may assist with mounting by preventing vertical and/or lateral slipping of the section along the household structure.

When the one or more sections 200 are mounted to the household structure, the household structure may extend all the way through the central opening 206 of each of the one or more sections 200, such that a terminal surface of the household structure contacts an inner wall 216 of each section 200 opposite to the slot opening 208. In this way, the cat recreation structure 100 consumes minimal lateral space—only equivalent to a thickness of the body portion wall. Such a snug fit may help to ensure a sturdy climbing structure for the cat. In situations where the one or more sections 200 are desired to be mounted to an edge of a door frame, the door may not be capable of closing when the one or more sections 200 are mounted on the inside of the door frame. In other embodiments, the door may not be capable of closing when the apparatus 100 is secured thereto, in which it may be advisable to utilize the apparatus 100 on a corresponding door frame that may that act as a partition between two rows but may not involve a door. In each embodiment, the example cat recreation structure 100 takes up a negligible amount of lateral space while allowing for sufficient entertainment for the cat.

To enable mounting to and/or removal from the household structure without damaging the household structure, at least part of the body portion may be sufficiently flexible to allow for expansion and contraction of a width of the slot 208 within a fixed range. For example, in some embodiments, the slot 208 may have a first width when the body portion 202 is in the default configuration. The first width may be in a range of about 3 inches to 5 inches, 2.5 inches-5.5 inches, and/or 5.5 inches to 8.5 inches to accommodate surfaces as wide as, for example, but not limited to, a cinderblock. Upon the exertion of opposing forces against opposing arms of the body portion 202 along an opening of the slot 208, the slot 208 may increase to a second width that is larger than the first width. By way of non-limiting example, the second width may be in a range of about 4 inches to 11 inches. In this way, the body portion 202 may be selectively expanded to enable mounting upon and/or removal from a variety of household structures. It will be appreciated that the body portion 202 may be sufficiently flexible to allow for some amount of expansion, but also sufficiently rigid to maintain a fixed position on the household structure to which it is mounted. Preferably, an amount of force required to flex the opposing arms to adjust the width of the slot is low enough that a single person can apply the necessary force to mount and/or dismount the section without the use of any aid. In some embodiments, the entire arcuate wall defining the side portion is composed of a flexible material, and in other embodiments, only the opposed arms of the C-shape are composed of the flexible material. In some embodiments, the opposing arms each have one or more of strips of craft foam or weather stripping secured to wall-facing lengths of 216 for improved adherence and/or prevention of scratching or leaving marks on the wall(s) or door(s) that the opposing arms engage.

To assist with clamping the household structure or a portion of the household structure within each of the one or more sections 200, opposing engagement surfaces 216 may extend along at least a partial length of the slot 208, illustrated at least in FIGS. 1-4. It will be appreciated that the engagement surfaces 216 may extend longitudinally beyond the body portion 202, along one or both ends. The engagement surfaces 216 may be configured to engage opposing surfaces of a household structure, e.g., opposing vertical surfaces of a partition wall, a door jamb, a window ledge, etc., to hold the section in place against the household structure. In some embodiments, the engagement surfaces 216 are flush against the opposing lateral surfaces of the household structure. For example, the engagement surfaces 216 may rest flush against opposing sides of a wall. The biasing force may be exerted by the body section 202 against the household structure via the engagement features.

In some embodiments, the structure 100 may be sized such that the structure 100 extends beyond a trim or molding surrounding a door frame or window opening such that the entirety of each of the engagement surfaces 216 extends to contact the wall directly. In such cases, the trim or molding may assist in engaging the engagement surfaces 216 and retaining the section in a desired position. In particular, interior edges of the engagement surfaces 216 may abut edges of the trim or molding structure to help retain the section in the desired position. In some embodiments, the engagement surfaces 216 may include one or more removeable fasteners 218, illustrated at least in FIGS. 15A-15D. For example, the removeable fasteners 218 may include one or more removable adhesives, one or more hook and loop fasteners, snaps, grooves, locking mechanisms, clips, friction fasteners, magnets, Command™ strips, craft foam, weather stripping, and/or the like. The one or more removeable fasteners 218 may help to increase the engagement of the engagement surfaces with the wall, thereby increasing stability of the section and retaining the section in the desired position. By way of non-limiting example, a number of removable fasteners 218 on each engagement surface of the section may be between 1 and 8.

In the illustrated embodiment, the opposing engagement surfaces 216 comprise a first engagement surface and a second engagement surface. Both the first and second engagement surfaces 216 may be substantially planar and/or extend substantially parallel to one another. For example, an angle of the first engagement surface with respect to the second engagement surface may with within a range of about 0 to 15 degrees. It will be appreciated that this angle may vary as the body portion is expanded and/or compressed, as the engagement surfaces may move together and/or apart along an arcuate path defined by the curvature of the body portion.

In the illustrated embodiment, the first and second engagement surfaces 216 do not touch or contact one another when the body portion is in the default configuration. In such embodiments, the sections 200 may be nested together to assist with storage and/or transportation of the sections. For example, a first opposing arm of a first section of the one or more sections 200 may be inserted through the slot 208 and into the central opening 206 of a second section on the one or more sections 200. However, in other embodiments, the first and second engagement surfaces may be at least partially in contact with each other when the body portion 202 is in the default configuration, such that the body portion 202 forms a closed cylinder. In other embodiments, when the body portion 202 is in the default configuration, the slot does not form a closed cylinder and the opposing arms are not less than three inches apart.

Figures 16A, 16B:
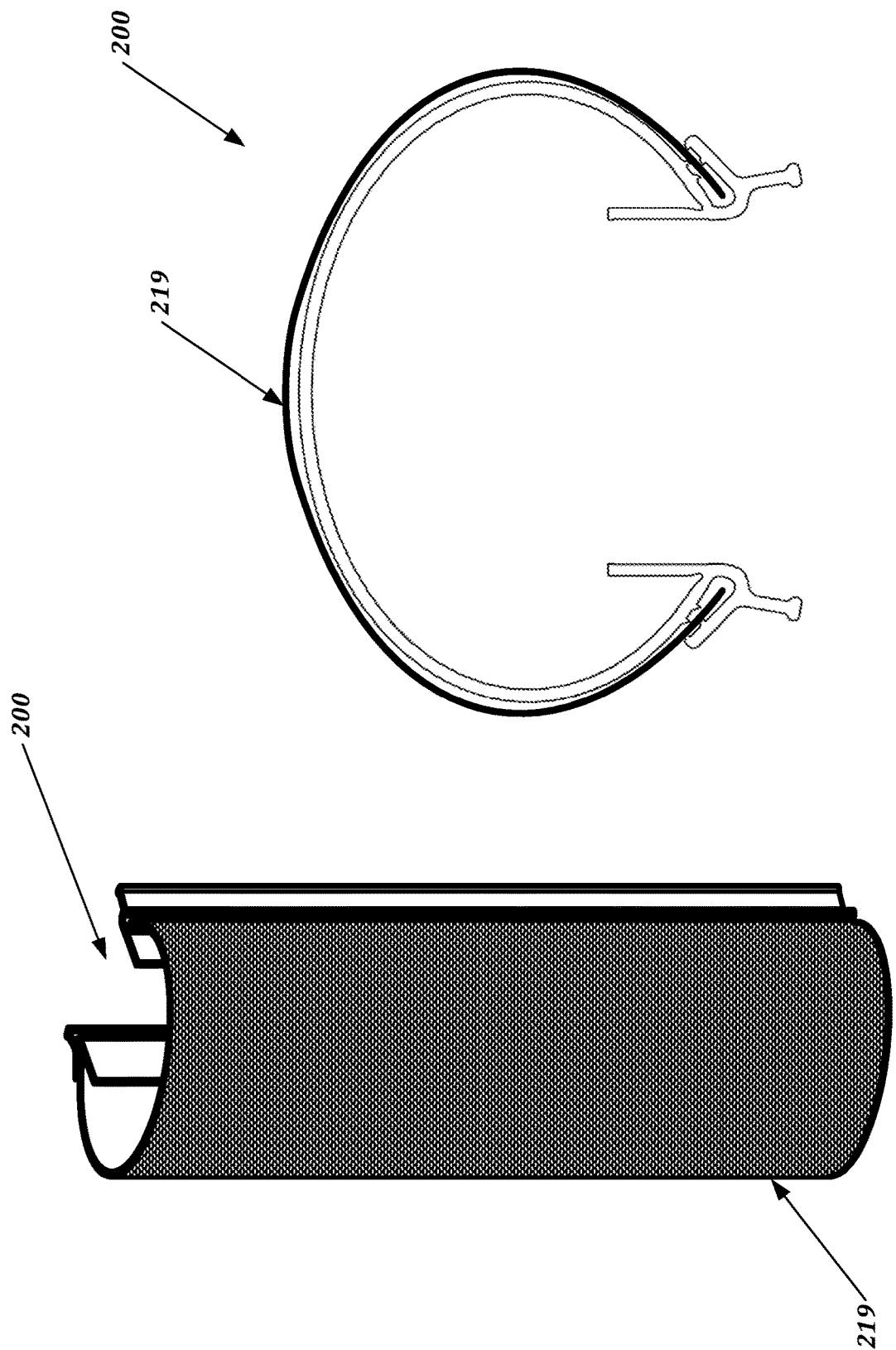
FIG. 16A illustrates a removable surface 219 secured to one of the sections 200.
FIG. 16B further illustrates the removable surface 219 secured to one of the sections 200.

In some embodiments, the section 200 comprises one or more lips 220 disposed at edges of the opposing arms, in a direction substantially parallel to a portion of the outer surface of the body portion 202, illustrated at least in FIGS. 1-5. The lips may be used to help retain a removable surface 219 (e.g., carpet, any suitable rough surface, or any suitable semi-rough surface) against the outer surface of the body portion, illustrated at least in FIGS. 16A-16B. For example, a first edge of the removable surface 219 may be inserted into a first lip of the one or more lips 220, while a second edge of the removable surface 219 may be inserted into the second lip of the one or more lips 220 such that the removable surface 219 covers substantially an entirety of the outer surface of the body portion 202. First and second gaps between the first and second lips of the one or more lips 220 and the exterior surface of the body portion 202 may be only slightly larger than a width of the removable surface 219 to be inserted therein, such that the removable surface 219 will remain in place when first and/or second edges are inserted into the gap(s). To further secure the removable surface 219 in place with respect to the body portion 202, one or more fastening mechanisms (e.g., rivets, pegs, screws, etc.) may be inserted through the removable surface 219, the lip 220, and/or the body portion 202 to secure the removable surface 219 in place. In some embodiments, one or more teeth disposed within the gaps formed between the outer surface and the lips 220 may assist with securing the removable surface 219 against the body portion 202. For example, the one or more teeth may be disposed on an inner surface of at least one of the first and second lips of the one or more lips 220, and/or on the outer surface of the body portion 202, facing the one or more lips 220.

In still further embodiments, one or more projections 222 may extend radially outward from the one or more lips 220 to assist with mounting and/or dismounting of the section via adjustment of a width of the slot 208, illustrated at least in FIGS. 1-4. In the illustrated embodiment, there are two projections of the one or more projections 222: a first projection extending radially outward from the first lip and a second projection extending radially outward from the second lip. The one or more projections 222 may be spaced slightly apart from the corresponding engagement surfaces along a circumference of the body portion 202 of the section 200, such that the one or more projections 222 will not be flush against a household surface to which the section 200 is clamped. In this way, a user can grasp at least a portion of the one or more projections 222 to assist with mounting and/or removal of the section 200 from a surface against which it is clamped without getting the user's finger's stuck between the section 200 and the surface to further assist with grasping of the one or more projections 222 when the section 200 is clamped against the household surface, the one or more projections 222 may extend away from the engagement surfaces by an angle of between 3 and 30 degrees. In this way, the one or more projections 222 may not be entirely flush against the household surface when the section is mounted, but they also may not extend outward far enough to be accidentally maneuvered.

In some embodiments, the cat recreation structure includes one or more ledges 300 for the cat to rest upon, illustrated at least in FIGS. 5-11. The one or more ledges 300 may be configured for placement on top of the section 200, on the bottom of the section 200, and/or in between sections 200 of the structure 100. For example, each of the one or more ledges 300 may comprise a substantially planar surface configured to extend perpendicularly to a longitudinal axis of the cat recreation structure when the ledge 100 is mounted thereto. A shape of the surface may be any shape suitable for cat resting, and/or may be large enough to accommodate one or more cats thereon. Each of the one or more ledges 300 may comprise a ledge securing portion 302 for removably connecting the ledge 300 to a section 200, illustrated at least in FIGS. 6 and 9-10. In some embodiments, the ledge securing portion 302 may be disposed on a bottom surface of the ledge 300, a top surface of the ledge 300, or both. The ledge securing portion 302 may be any suitable attachment and/or securing means that affords sufficient securing and/or affixation to prevent the ledge 300 from moving with respect to the one or more sections 200 to which it is attached. By way of non-limiting example, the ledge securing portion 302 may comprise a placement ring 304 having a shape that corresponds to the inner surface of the arcuate wall of the body portion 202, illustrated at least in FIGS. 5-7. The placement ring 304 may thus fit inside the body portion 202 of the section 200 and be removably attached thereto via, e.g., a friction fit, snap fit, adhesive, any aforementioned securing means, and/or any other suitable securing means. Edges of the placement ring 304 defining a slot therebetween may be configured to engage inward-facing surfaces of the engagement surfaces of the section, to further secure a fit between the ledge 300 and the section 200.

One or more components of the recreational structures 100 disclosed herein may be composed of recycled and/or recyclable materials. By way of non-limiting examples, the recreation structures 100 may be at least partially composed of recycled plastics that are capable of being recycled. The exterior surface of the sections 200 may be composed of any suitable material having a sufficiently high coefficient of friction to enable a cat to climb, and/or a sufficiently high roughness to enable effective scratching. For example, the exterior surface may include a carpet-like material. In some embodiments, the exterior surface may comprise a second material (e.g., a carpet material) attached to the exterior portion of the section using tacks, adhesive, and/or the like. In other embodiments, the exterior surface may be formed integrally with the section.

Dimensions of the cat recreation structure 100 may vary to accommodate various household structures. In general, a height of the section 200 along the longitudinal axis may be within a range of about 10 to 30 inches, and preferably within a range of about 15 to 20 inches. A width of the arcuate wall that defines the body portion 202 may be small enough to enable the section to maintain a low profile when mounted to a household structure, e.g., within a range of about 0.5 to 5 inches. A diameter defined by the arcuate portion may be in a range of about 5 to 10 inches.

While the illustrated embodiments have been described as clamping to household structures that are generally rectangular, having at least two substantially planar and opposing surfaces, it will be appreciated that the cat recreational structures 100 as described herein may also be used to clamp a variety of household structures. By way of non-limiting example, the section 200 could clamp around a generally cylindrical household structure such as a leg of a table, a post, the upholstered arm of a chair, etc.

Embodiments of the present disclosure provide a system operative by a set of methods comprising instructions configured to operate the aforementioned components in accordance with the methods. The following depicts an example of a method of a plurality of methods that may be performed by at least one of the aforementioned components.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 17:
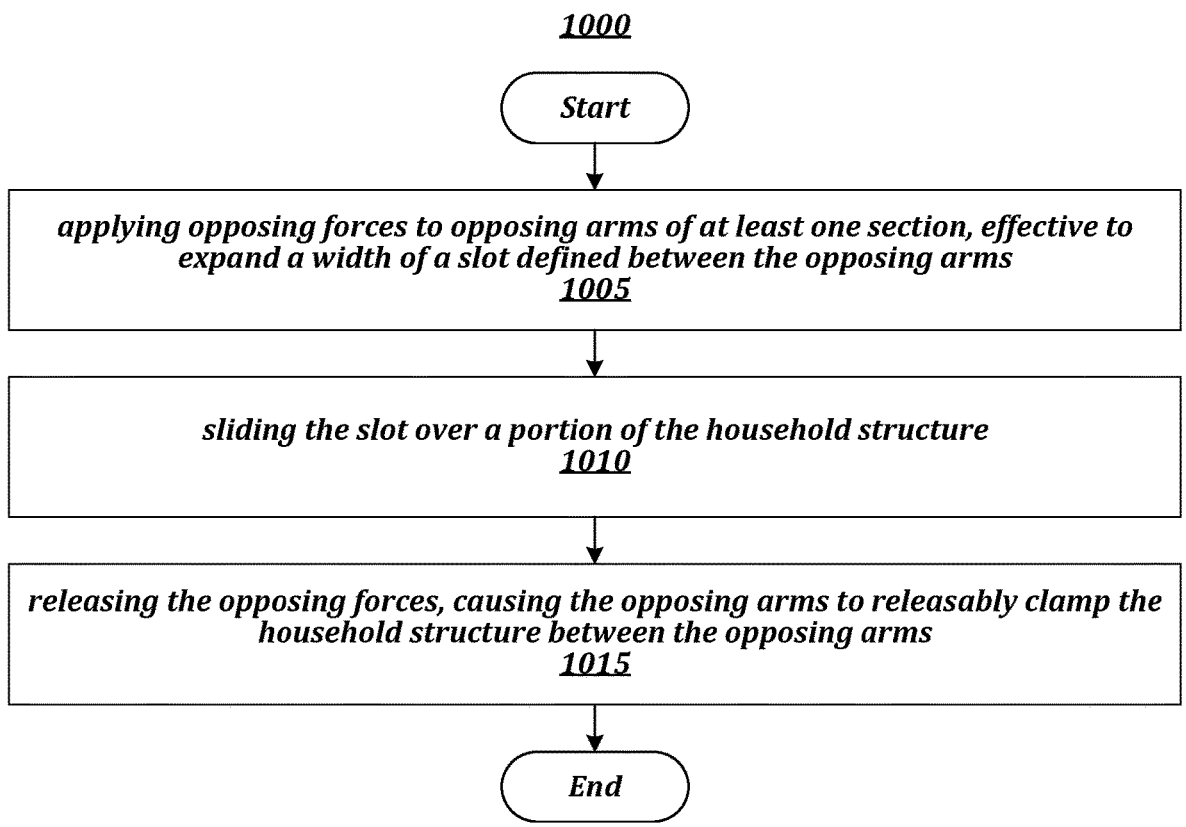
FIG. 17 is a flow chart of a method 1000 of mounting and dismounting a modular cat recreation structure.
Figure 18:
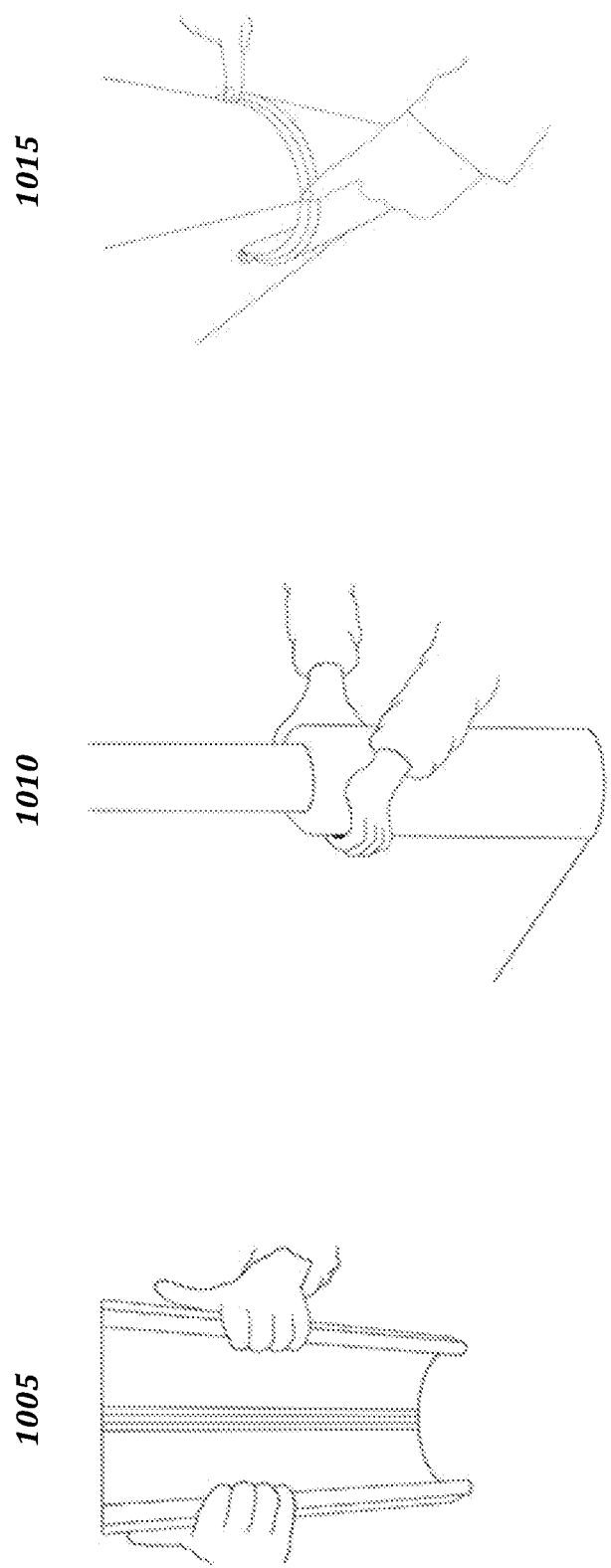
FIG. 18 illustrates the method 1000.

Consistent with embodiments of the present disclosure, a method 1000 may be performed by at least one of the aforementioned components of a modular cat recreation structure 100. An example method 1000 is provided for mounting and/or dismounting one or more sections 200 of a modular cat recreation structure to a household structure or a portion of a household structure, without the use of tools and/or without damaging the household structure, illustrated at least in FIGS. 17 and 18.

The method 1000 may begin at step 1005 by applying opposing forces to (e.g., flexing) opposing arms of at least one section, effective to expand a width of a slot defined between the opposing arms. The requisite application of forces may be accomplished manually, and in some embodiments may be accomplished with a single person's hands. One hand may apply a first force in a first direction to a first opposing arm and the other hand may apply a second force in a second direction to a second opposing arm. In some embodiments, the opposing forces may be applied to first and second projections that extend axially away from the first and second opposing arms. The forces may be applied until the slot width is slightly larger than a width of a household structure or portion of a household structure onto which the section 200 is desired to be mounted.

Once the width of the slot 208 has been expanded sufficiently, the method may continue at step 1010 by sliding the slot 208 over a portion of the household structure. In a similar embodiment, the household structure or a portion thereof may be inserted through the slot 208 and into a central opening 206 defined by an arcuate body portion 202 of the section 200.

At step 1015, the forces may then be released, which may cause the opposing arms to releasably clamp the household structure or portion of the household structure between the opposing arms. In some embodiments, the opposing forces may first be applied directly to the opposing arms until the section 200 has been placed in the desired position; the opposing forces may then be transferred to the first and second projections to avoid the user's fingers getting caught between the opposing arms and the household structure clamped between. In some embodiments, opposing engagement surfaces 216 disposed on terminal edges of the opposing arms may assist with clamping the household structure or the portion of the household structure.

Figure 3:
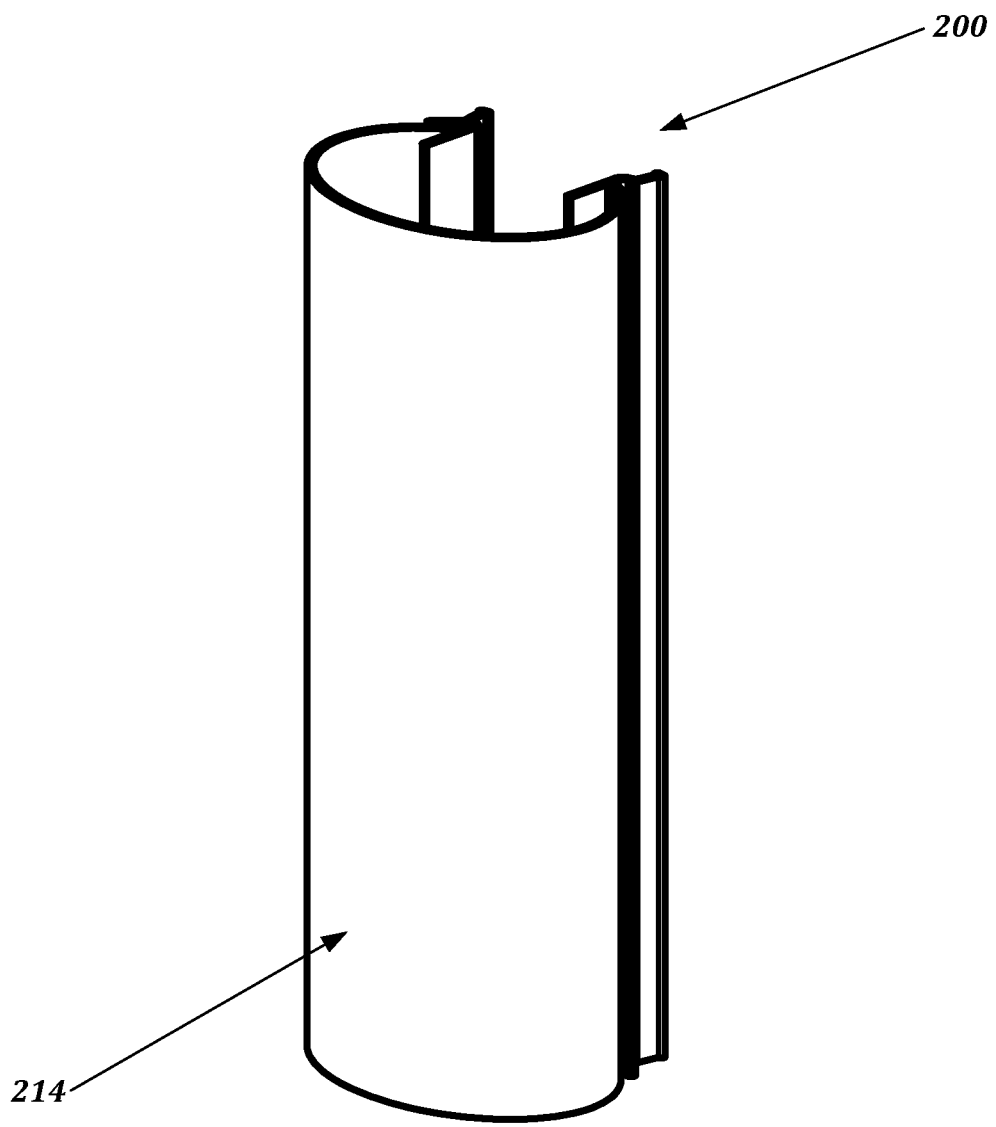
FIG. 3 further illustrates the section 200 of the cat recreation structure 100.
Figure 4:
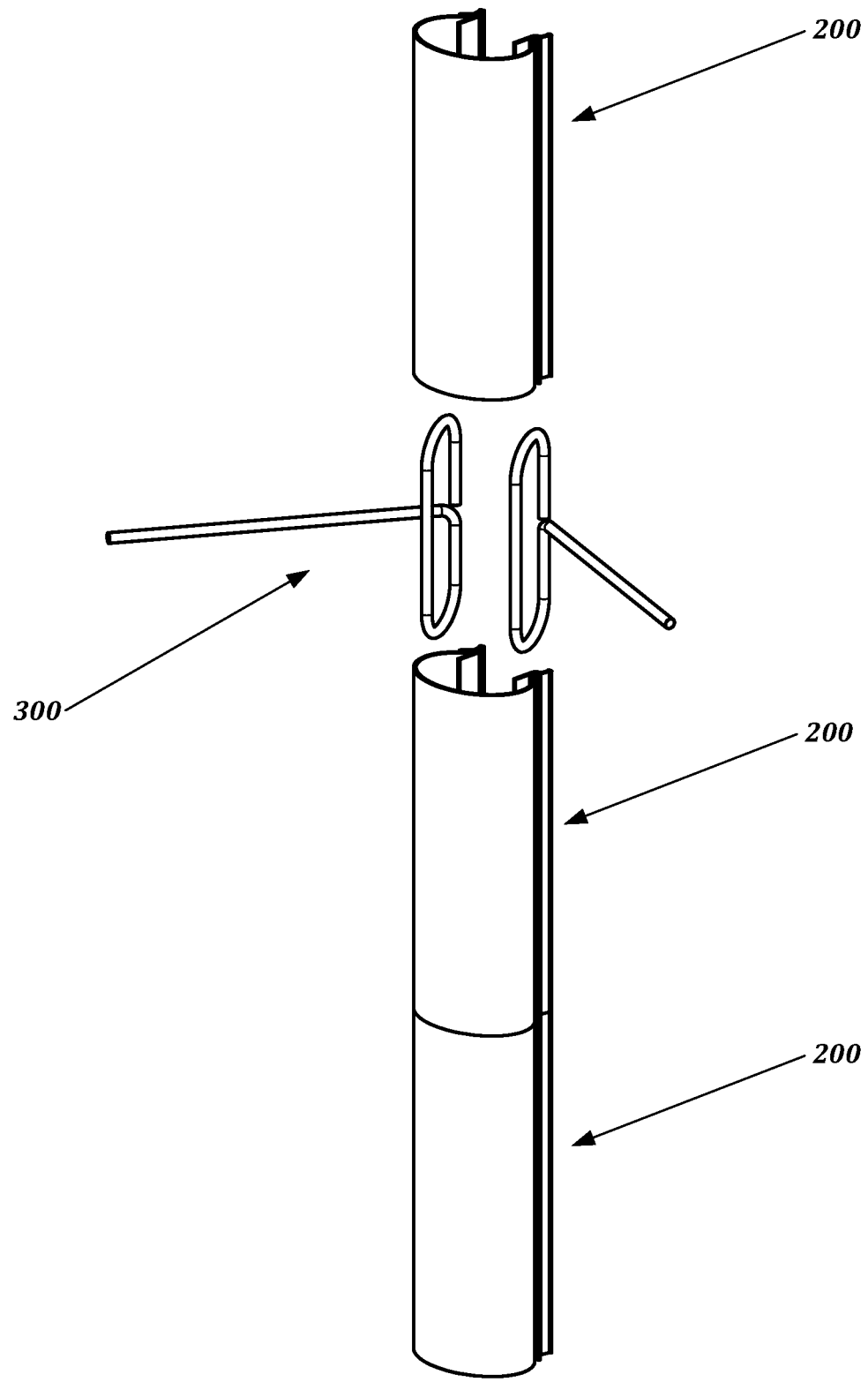
FIG. 4 illustrates a plurality of sections 200 with a portion of a ledge 300.
Figure 5:
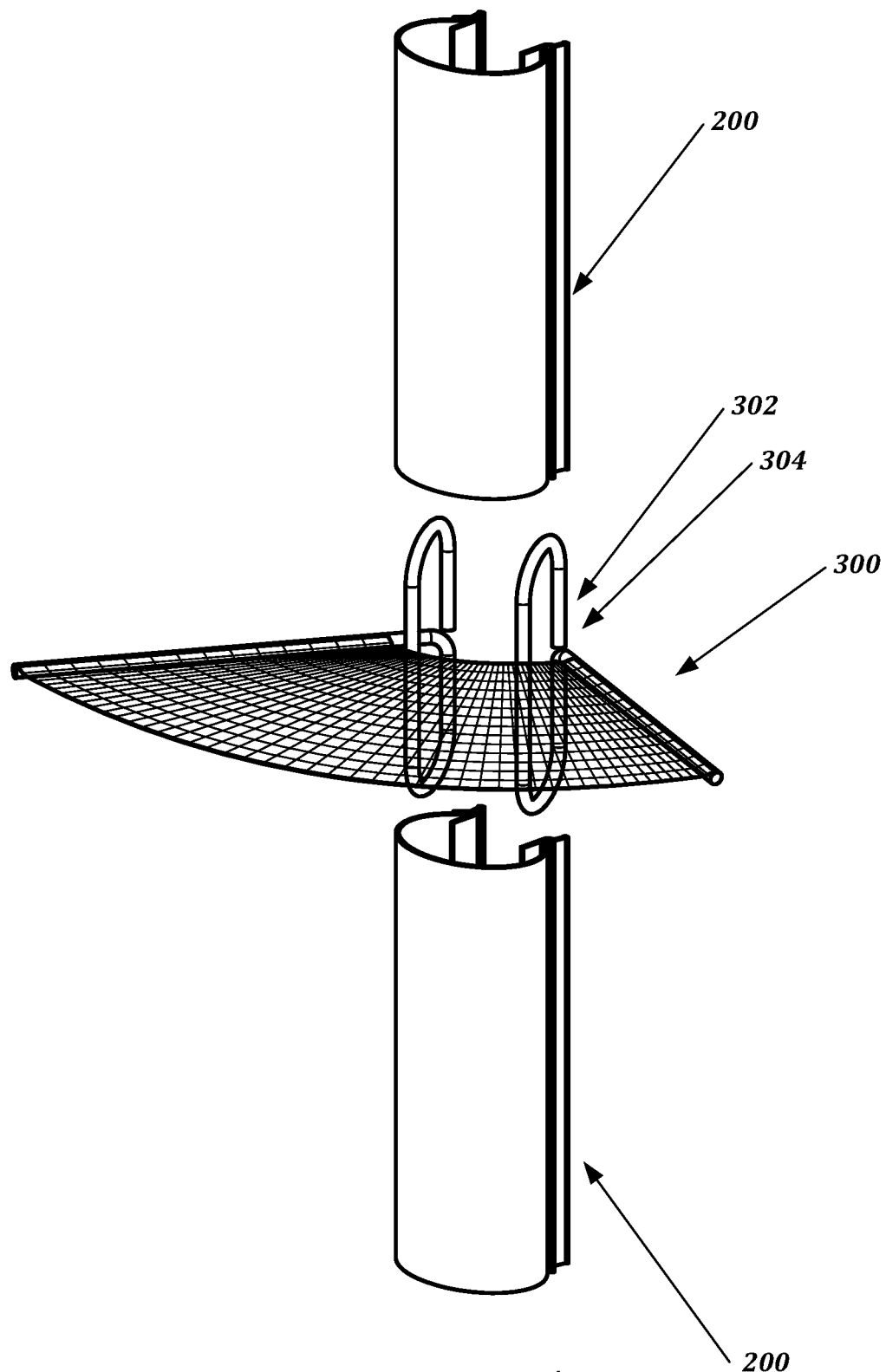
FIG. 5 illustrates the cat recreation structure 100 with the plurality of sections 200 and a portion of the ledge 300.
Figure 6:
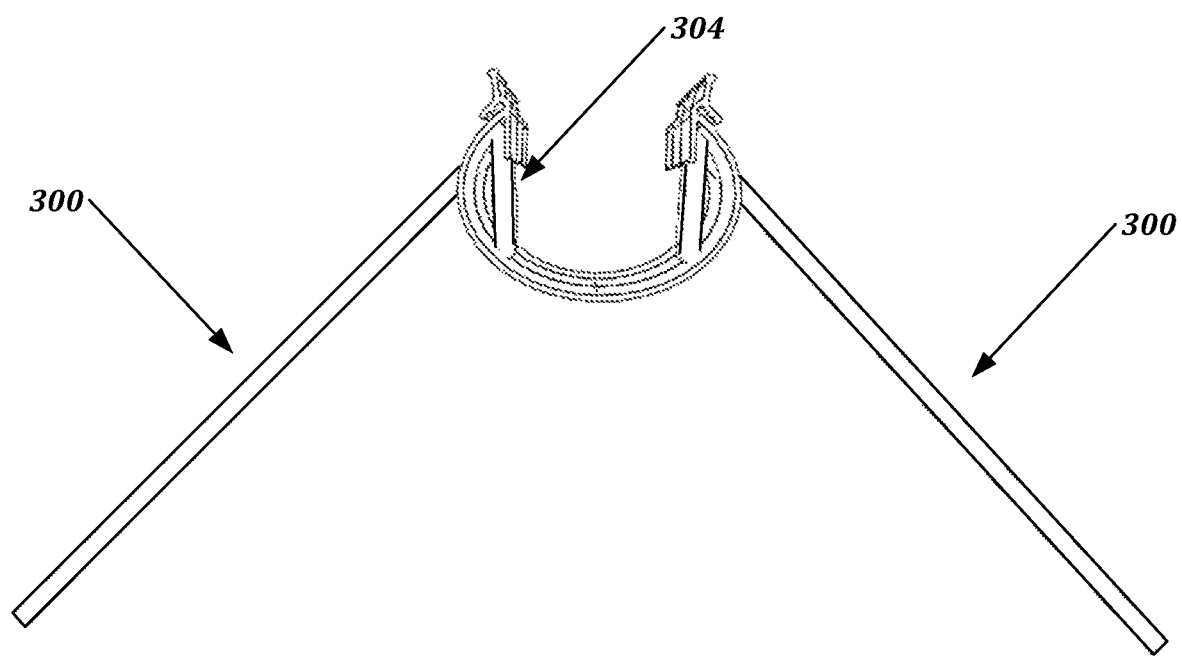
FIG. 6 illustrates a top view of the cat recreation structure 100 with the plurality of sections 200 and a portion of the ledge 300.
Figure 7:
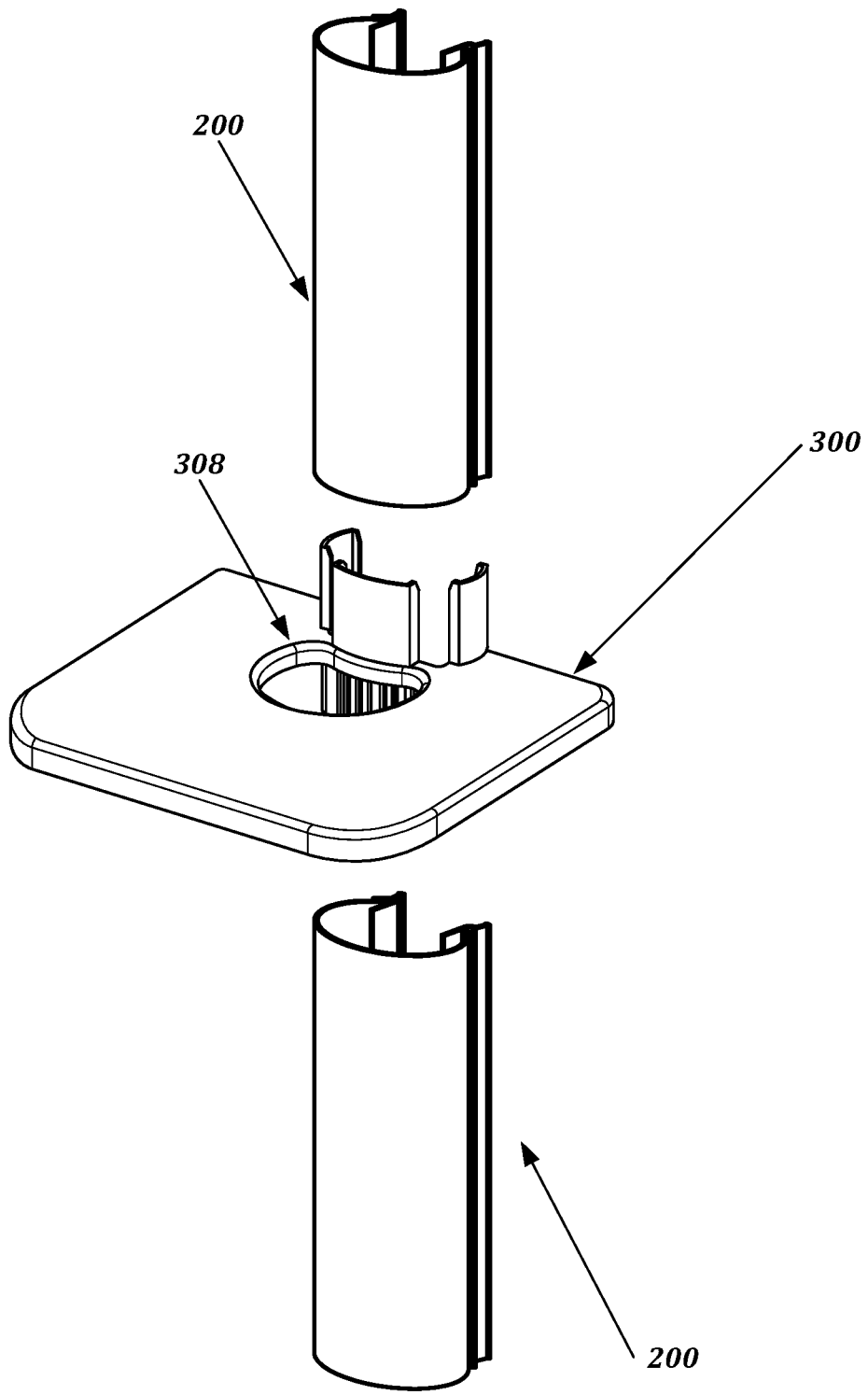
FIG. 7 illustrates the cat recreation structure 100 with the plurality of sections 200 and another ledge 300.
Figure 8:
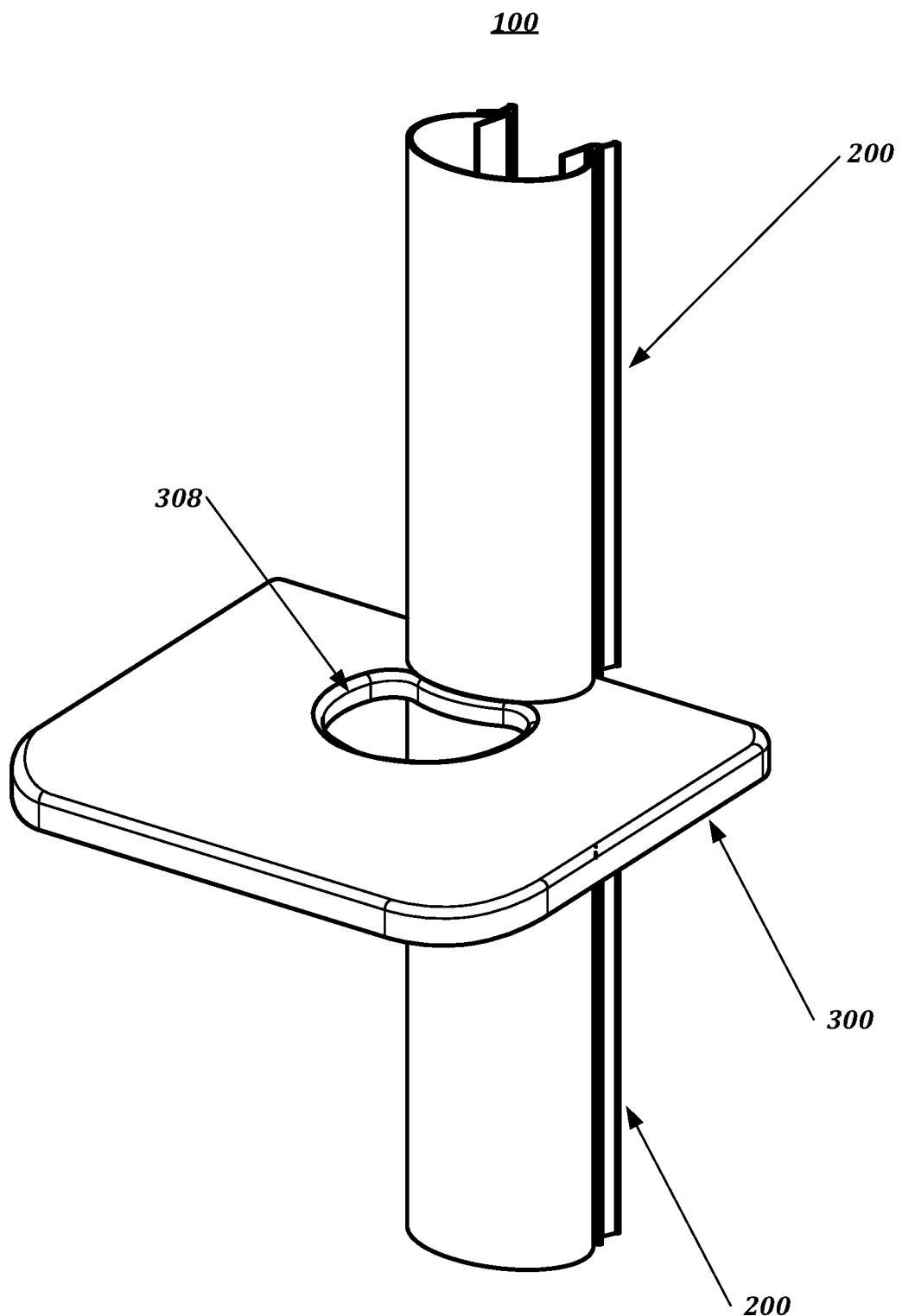
FIG. 8 illustrates the cat recreation structure 100 assembled with the plurality of sections 200 with a portion of the ledge 300.
Figure 9:
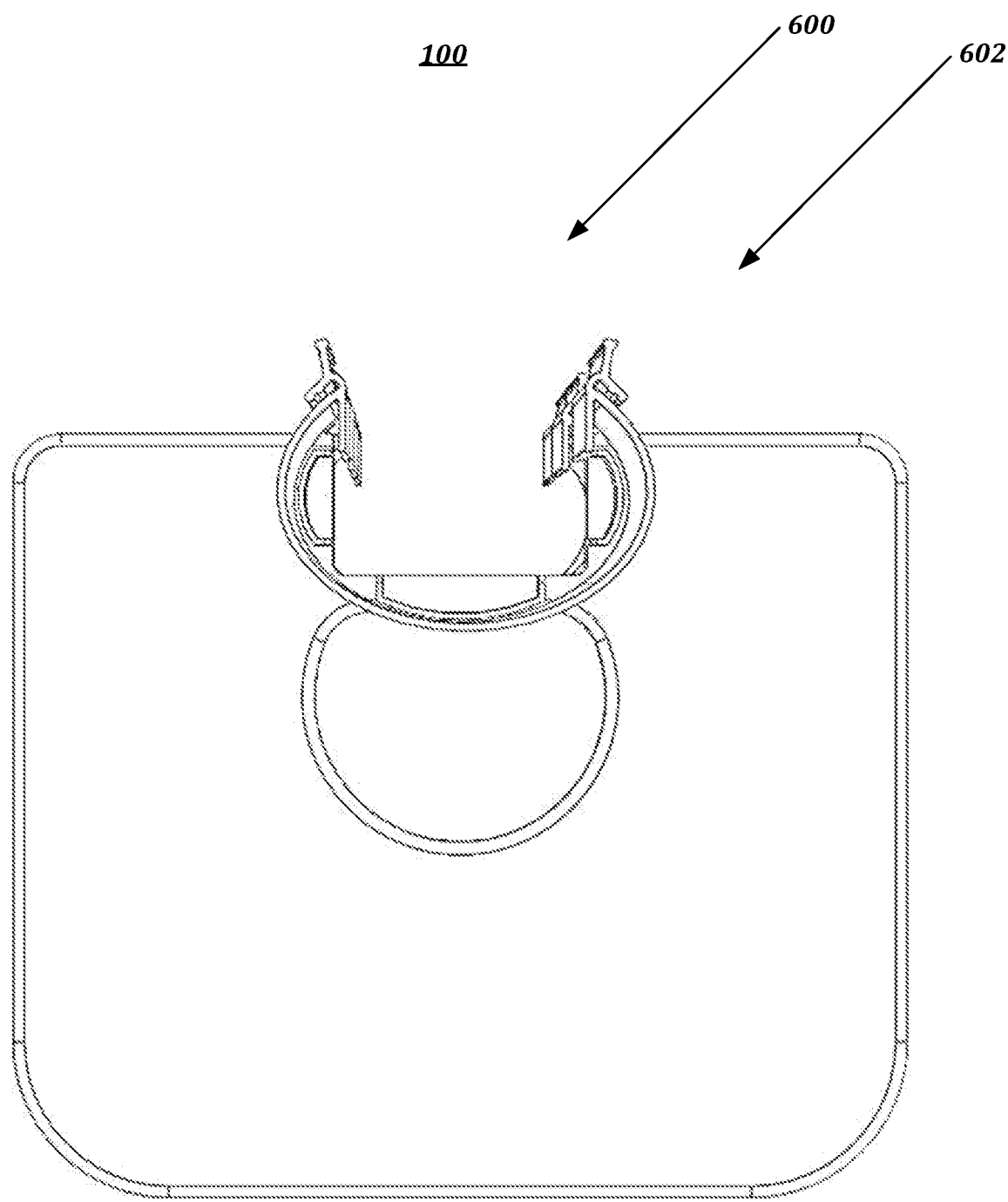
FIG. 9 illustrates a top view of the cat recreation structure 100 assembled with the plurality of sections 200 with a portion of the ledge 300.
Figure 10:
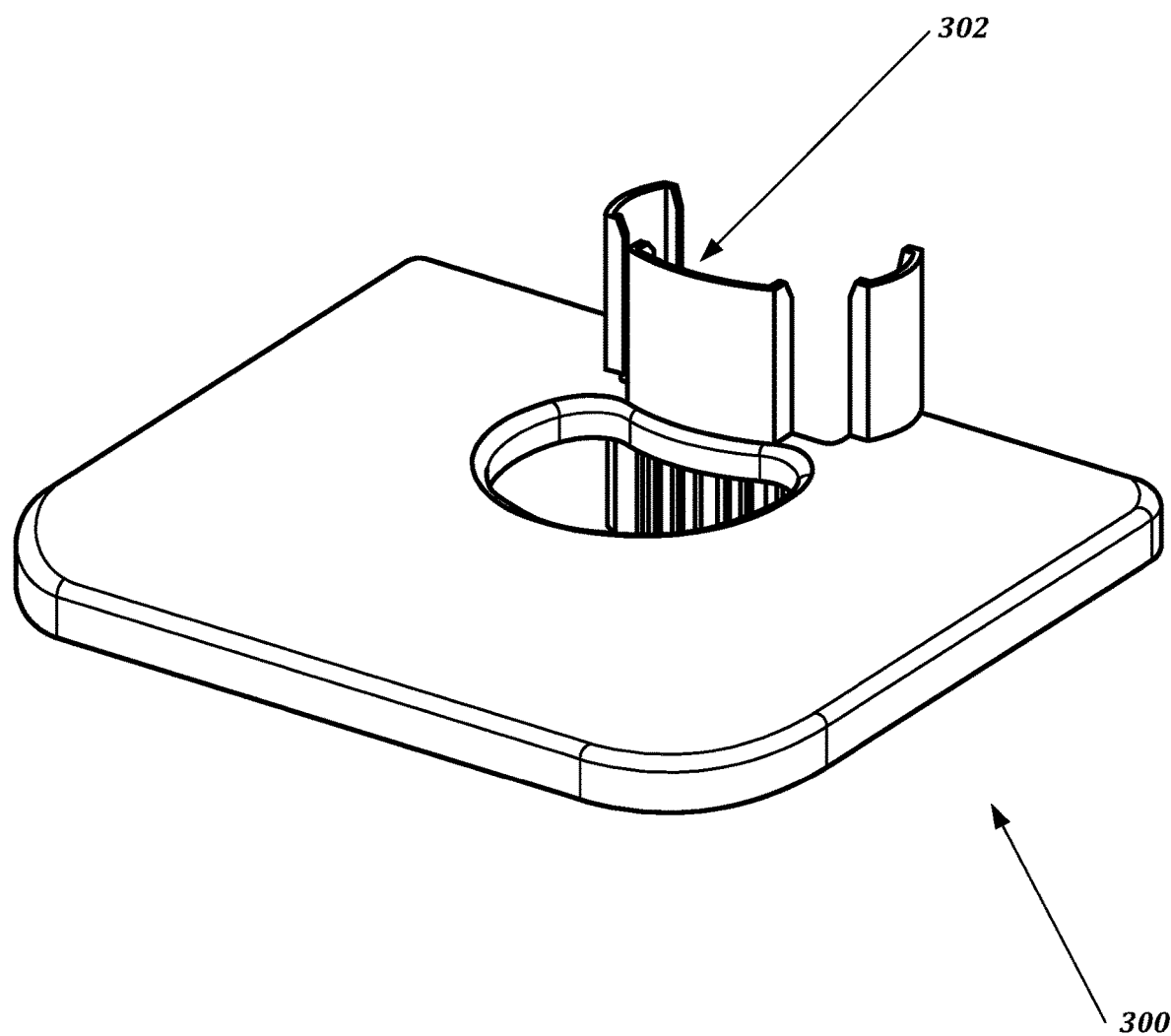
FIG. 10 illustrates the ledge 300.
Figure 11:
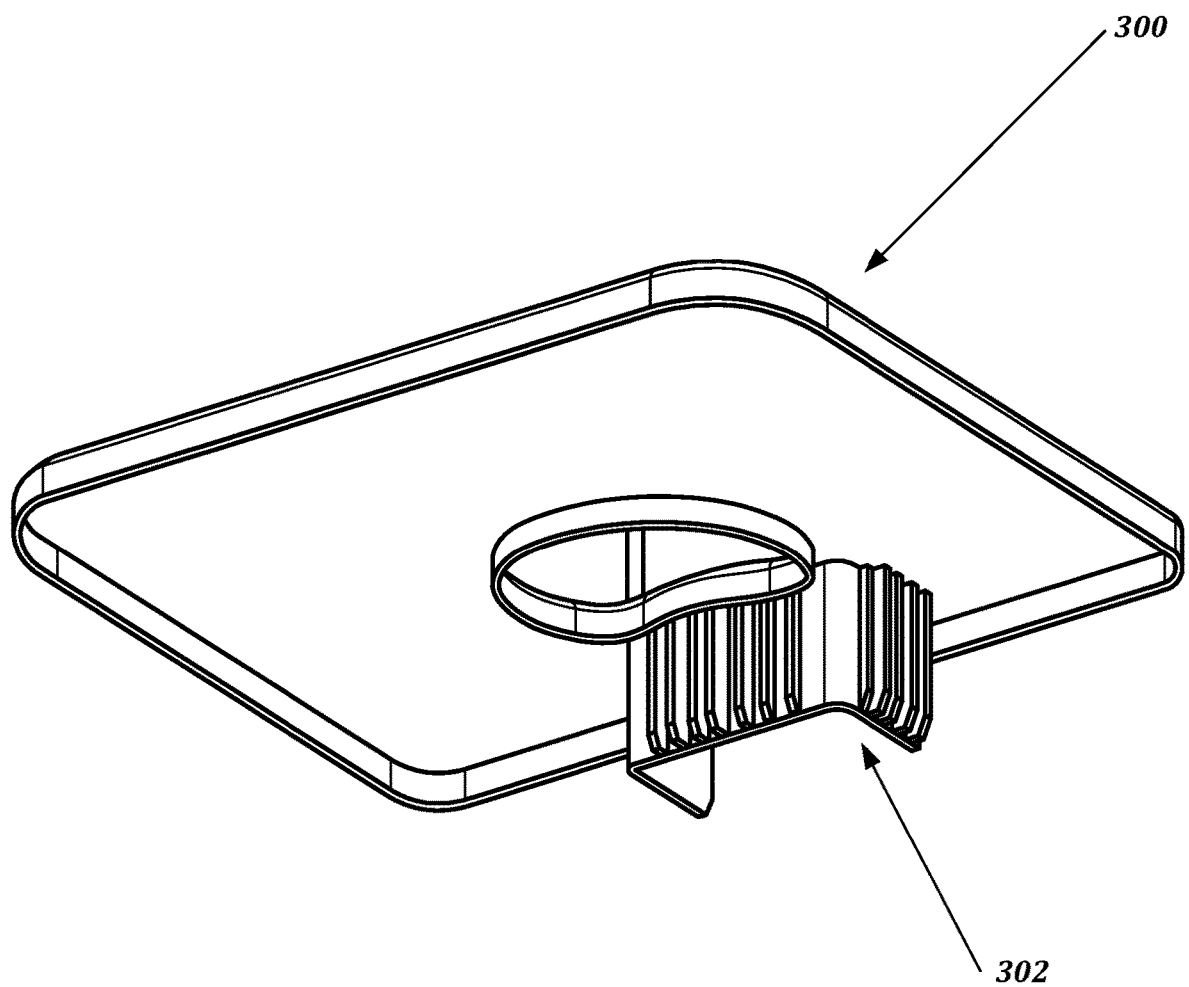
FIG. 11 further illustrates the ledge 300.

The method 1000 may be repeated with additional sections, which may be mounted to the household structure or the portion of the household structure adjacent to the first section. In some embodiments, a plurality of sections 200 may be stacked on top of one another, as illustrated in FIG. 3, enabling a cat to climb to a height corresponding to the combined height of the plurality of stacked sections 200. In the example method, the sections 200 may be stacked on top of one another such that there is no or minimal vertical space in between each section 200; in other words, the sections 200 may be stacked such that a top surface of one section 200 is flush with a bottom surface of another section 200. Once installed the sections can be slid up or down to set at the desired height on the wall and/or shifted one way or the other so that the lips 220 align. It is noted that if there is chair rail, light switch plate, or other anomaly on either side of the wall, precise alignment may not be feasible. However, it will be appreciated that the method may involve stacking the sections 200 to allow for space in between each section 200. The entire method up to this point may be completed within a range of 10 seconds to 1 minutes per section, and preferably within a range of 0.5 minutes to 2 minutes per section.

In further embodiments, the method may involve removing one or more sections 200 from the household structure. For example, at step 1020, when the at least one section is mounted to the household structure, the user may apply opposing forces to the opposing arms of the section, effective to expand the width of the slot to a width that is slightly larger than a width of the household structure to which the section is mounted. Similar to the mounting step, the removal step may involve a user grasping first and second projections 222 to assist with the application of opposing forces. Advancing to step 1025, the user may then slide the section off the household structure without damaging the household structure. Ending at step 1030, the user may then release the opposing forces, such that the section reverts to a default configuration for storage and/or transport. It is noted that there may be scuff marks on the wall when the climber section is removed. These can be removed with soap and water on a cloth or a Magic Eraser™.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

The invention claimed is:

1. A modular cat climbing structure, comprising:
    a flexible elongated body portion comprising:
        an arcuate wall comprising an internal surface and a rough external surface, and
        a cavity defined within the arcuate wall;
    a first arm secured to and spanning a first end of the arcuate wall, the first arm comprising:
        a first engagement surface disposed on a terminal edge of the first arm and extending substantially axially inward from the internal surface of the body portion and into the cavity,
        a first lip extending from the terminal edge of the first arm and opposing a portion of the rough external surface, and
        a first projection extending orthogonally from the first lip;
    a second arm secured to and spanning a second end of the arcuate wall, wherein the second arm and the first arm defining an opening to the cavity, the second arm comprising:
        a second engagement surface disposed on a terminal edge of the second arm and extending substantially axially inward from the internal surface of the body portion and into the cavity,
        a second lip extending from the terminal edge of the second arm and opposing a portion of the rough external surface, and
        a second projection extending orthogonally from the second lip,
    wherein the first arm and the second arm define an opening to the cavity,
    wherein the first engagement surface and the second engagement surface are configured to directly contact and apply a biasing force against a household structure responsive to a portion of the household structure being housed in the cavity.

2. The modular cat climbing structure of claim 1, further comprising a ledge removably secured in one or more of the following configurations:
    on a top edge of the body portion, and
    on a bottom edge of the body portion;
    wherein the ledge defines an aperture extending therethrough, sized to allow a cat to pass through the aperture.

3. The modular cat climbing structure of claim 2, wherein the ledge comprises one or more placement rings, one of the one or more placement rings engaging an inward-facing surface of one of the first engagement surface and the second engagement surface to secure a fit between the ledge and the body portion.

4. The modular cat climbing structure of claim 2, wherein the ledge comprises one or more securing protrusions dimensioned proportionally to an inner perimeter of the arcuate wall such that the one or more securing protrusions are flush against the arcuate wall.

5. The modular cat climbing structure of claim 1, further comprising a plurality of teeth disposed within gaps formed between the first lip and an outer surface of the arcuate wall and the second lip and the outer surface of the arcuate wall, the plurality of teeth being configured to secure a pliable surface around the rough external surface.

6. The modular cat climbing structure of claim 5, wherein respective edge portions of the first and second engagement surfaces are configured to abut trim or molding portions of the household structure to retain a position of the climbing structure when the portion of the household structure inserted into the slot includes molding or trim.

7. A modular cat climbing structure, comprising:
    an elongated arcuate body portion comprising:
        an external surface, and
        an internal surface defining a perimeter of a cavity within the body portion;
    a first arm secured to and spanning a first edge of the arcuate body portion;
    a second arm secured to and spanning a second edge of the arcuate body portion, wherein the second arm and the first arm defining an opening to the cavity;
    a first engagement surface disposed on a terminal edge of the first arm and extending substantially axially inward from the internal surface of the body portion and into the cavity, the first engagement surface being configured to directly contact and apply a biasing force to a first surface of a household structure responsive to a portion of the household structure being received in the cavity, wherein an edge portion of the first engagement surface is configured to abut trim or molding portions of the household structure to retain a position of the climbing structure responsive to a portion of the household structure having molding or trim being received in the cavity;
    a second engagement surface disposed on a terminal edge of the second arm and extending substantially axially inward from the internal surface of the body portion and into the cavity, the second engagement surface being configured to directly contact and apply another biasing force to a second surface of the household structure responsive to a portion of the household structure received in the cavity, wherein an edge portion of the second engagement surface is configured to abut trim or molding portions of the household structure to retain a position of the climbing structure responsive to a portion of the household structure having molding or trim being received in the cavity;
    a first lip disposed on the terminal edge of the first arm and extending in a direction substantially parallel to a corresponding portion of the external surface of the body portion; and
    a second lip disposed on the terminal edge of the second arm and extending in a direction substantially parallel to another corresponding portion of the external surface of the body portion.

8. The modular cat climbing structure of claim 7, wherein at least part of the body portion is flexible to allow for expansion and contraction of a width of the opening to the cavity within a fixed range yet sufficiently rigid to maintain a fixed position on the household structure to which it is mounted.

9. The modular cat climbing structure of claim 7, further comprising a ledge removably secured in one or more of the following configurations:
    on a top edge of the body portion, and
    on a bottom edge of the body portion;
    wherein the ledge defines an aperture extending therethrough, sized to allow a cat to pass through the aperture.

10. The modular cat climbing structure of claim 7, further comprising:
a first protrusion extending orthogonally from the first lip, and
a second protrusion extending orthogonally from the second lip.

11. The modular cat climbing structure of claim 7, wherein the first engagement surface and the second engagement surface comprise one or more removable fasteners configured to be removably affixed to the household structure, thereby increasing engagement with the household structure.

12. The modular cat climbing structure of claim 7, further comprising a plurality of teeth disposed within gaps formed between the first lip and the external surface and the second lip and the external surface, the plurality of teeth being configured to secure a pliable surface around the external surface.

13. A modular cat climbing structure comprising:
one or more sections being partially cylindrical and configured to be removably mounted to a household structure, wherein each of the one or more sections comprises:
a rough external surface;
an internal surface;
first and second opposing arms defining a slot therebetween;
a hollow central opening continuous with the slot and configured to accommodate a portion of the household structure therein;
first and second engagement surfaces disposed on terminal edges of the first and second opposing arms, wherein each of the first and second engagement surfaces extends substantially axially inward from the internal surface and into the hollow central opening, and is configured to directly contact and apply a biasing force against first and second opposing surfaces of the household structure when the portion of the household structure is inserted into the slot, and wherein respective edge portions of the first and second engagement surfaces are configured to abut trim or molding portions of the household structure to retain a position of the climbing structure when the portion of the household structure inserted into the slot includes molding or trim; and
first and second projections extending axially away from the first and second opposing arms, the first and second projections being operable to adjust a width of the slot via application of first and second opposing forces to the first and second projections.

14. The modular cat climbing structure of claim 13, wherein the first and second engagement surfaces comprise one or more removable fasteners configured to be removably affixed to the household structure, thereby increasing engagement of the first and second engagement surfaces with the household structure.

15. The modular cat climbing structure of claim 14, wherein the one or more removable fasteners comprises one or more of the following:
a hook and loop fastener,
adhesive,
a friction-based fastener, and
a magnet.

16. The modular cat climbing structure of claim 13, further comprising one or more ledges, each of the one or more ledges defining an aperture extending therethrough, sized to allow a cat to pass through the aperture, and each of the one or more ledges being configured to be removably secured in one or more of the following configurations:
on a top portion the one or more sections,
on a bottom portion of the one or more sections, and
in between a first section of the one or more sections and a second section of the one or more sections.

17. The modular cat climbing structure of claim 16, wherein each of the one or more ledges comprises a placement ring shaped corresponding to an inner surface of the one or more partially cylindrical sections.

18. The modular cat climbing structure of claim 13, wherein a first section, of the one or more sections, is configured to mount on top of a second section, of the one or more sections.

19. The modular cat climbing structure of claim 13, further comprising:
a first lip disposed at an edge of the first opposing arm in a direction substantially parallel to a corresponding portion of an outer surface of the one or more sections, and
a second lip disposed at an edge of the second opposing arm in a direction substantially parallel to another corresponding portion of the outer surface of the one or more sections.

20. The modular cat climbing structure of claim 19, further comprising a plurality of teeth disposed within gaps formed between the first lip and the outer surface and the second lip and the outer surface, the plurality of teeth being configured to secure a pliable surface around the rough external surface.

* * * * *